(12) United States Patent
Pfortmiller et al.

(10) Patent No.: US 7,145,067 B2
(45) Date of Patent: Dec. 5, 2006

(54) GAME CALLING DEVICE

(75) Inventors: Glenn H. Pfortmiller, Great Bend, KS (US); Travis Fox, Ellinwood, KS (US)

(73) Assignee: Fox & Pfortmiller Custom Calls, LLC, Ellinwood, KS (US)

( * ) Notice: Subject to any disclaimer, the term of this patent is extended or adjusted under 35 U.S.C. 154(b) by 192 days.

(21) Appl. No.: 10/925,704

(22) Filed: Aug. 24, 2004

(65) Prior Publication Data

US 2005/0076768 A1    Apr. 14, 2005

Related U.S. Application Data

(60) Provisional application No. 60/510,852, filed on Oct. 14, 2003.

(51) Int. Cl.
*A63H 33/40* (2006.01)
(52) U.S. Cl. .................... 84/380 R; 446/204; 446/206; 446/208; 446/397
(58) Field of Classification Search .............. 84/380 R; 446/204, 206–209, 213, 397
See application file for complete search history.

(56) References Cited

U.S. PATENT DOCUMENTS

| | | | |
|---|---|---|---|
| 2,035,243 A | 3/1936 | Minevitch | |
| 3,054,216 A | 9/1962 | Testo | |
| 3,466,794 A | 9/1969 | Pritchard et al. | |
| 3,802,120 A | 4/1974 | Erhart | |
| 3,928,935 A * | 12/1975 | Beadles, Jr. | ................. 446/208 |
| 4,030,241 A | 6/1977 | Gallagher | |
| 4,221,075 A | 9/1980 | Gallagher | |
| 4,246,824 A * | 1/1981 | Hanson et al. | ................. 84/336 |
| 4,709,651 A * | 12/1987 | Lance | .................... 116/137 R |
| 5,113,784 A | 5/1992 | Forselius | |
| 5,230,649 A | 7/1993 | Robertson | |
| 5,885,126 A | 3/1999 | Carlson | |
| 6,120,341 A * | 9/2000 | Hafford | ..................... 446/208 |
| 6,231,418 B1 | 5/2001 | Hancock et al. | |
| 6,413,139 B1 | 7/2002 | Douglas | |
| 6,435,933 B1 | 8/2002 | Browne | |
| 6,926,578 B1 * | 8/2005 | Casias et al. | ............... 446/202 |

* cited by examiner

*Primary Examiner*—Gary F Paumen
(74) *Attorney, Agent, or Firm*—Jeffrey L. Thompson; Thompson & Thompson, P.A.

(57) ABSTRACT

A game calling device capable of producing variable pitched sounds includes a truncated fan-shaped body having a mouthpiece end and a discharge end and multiple bores extending through the body from the mouthpiece end to the discharge end. First and second reed inserts are located in two of the bores and are tuned to produce high and low pitched sounds. A whistle insert is located in a third one of the bores for producing a whistling sound. A mouthpiece having three separate inlet openings is located at the mouthpiece end of the body and can be used to blow air through all three bores simultaneously or one at a time. The three bores extend through the body in a diverging configuration relative to each other from the mouthpiece end toward the discharge end. The reed inserts and whistle insert are held within the respective bores of the body by O-rings.

20 Claims, 3 Drawing Sheets

GAME CALLING DEVICE

RELATED APPLICATIONS

This application claims the benefit of the Applicants' U.S. Provisional Patent Application No. 60/510,852 filed on Oct. 14, 2003.

BACKGROUND OF THE INVENTION

1. Field of the Invention

The present invention relates generally to game calls and, in particular, to game calls capable of producing variable pitched sounds.

2. Description of the Related Art

Game calls have been used for many years by hunters, photographers and nature lovers to attract animals to a desired location, usually near the person using the call. Game calls operate to mimic the sound of a particular animal as realistically as possible. Some calls are designed to attract animals of the opposite gender, while other calls are designed to attract predators of the animal that the call is intended to mimic. A call must realistically mimic the sound made by the animal for which it is intended to simulate to be effective as a game call.

There are many different types and configurations of game calls, including those made up of reeds, diaphragms, or whistles. The most common type of game calls are reed-type game calls. These game calls have a reed disposed inside an air passage or air chamber that vibrates at a certain tone or pitch when air is blown into a mouthpiece of the game call. The vibrating reed creates a sound that is emitted from an outlet of the call. Some prior art reed-type game calls have multiple reeds and/or air passages that can be selectively opened or closed to simulate a variety of animal sounds. Examples of reed-type game calls are disclosed in U.S. Pat. No. 6,435,933 issued to Browne, U.S. Pat. No. 3,928,935 issued to Beadles, Jr., U.S. Pat. No. 3,466,794 issued to Pritchard, and U.S. Pat. No. 3,054,216 issued to Testo.

Diaphragm-type game calls utilize a vibratable diaphragm, such as a rubber band, stretched over an air passage opening such that the diaphragm vibrates upon air passing through the air passage. Examples of diaphragm-type game calls are disclosed in U.S. Pat. Nos. 4,030,341 and 4,221,075 both issued to Gallagher and in U.S. Pat. No. 6,231,418 issued to Hancock et al.

Whistle-type game calls are configured to simulate the whistling sound made by certain waterfowl. For example, both the drake and the hen of certain duck species, such as the Pintail, Wood Duck, American Widgeon, and the Green-winged Teal, make a whistling sound that can be mimicked by a whistle-type game call. Game calls designed to emulate the whistling sound made by whistling ducks are disclosed, for example, in U.S. Pat. No. 6,413,139 issued to Douglas, U.S. Pat. No. 5,885,126 issued to Carlson, and U.S. Pat. No. 5,230,649 issued to Robertson.

While each of the game calls described above are presumably suitable for their intended purpose, they do not provide an effective game call for mimicking the broad range of sounds produced by certain waterfowl, such as Sandhill Cranes. Accordingly, there is a need in the industry for an improved game call.

SUMMARY OF THE INVENTION

An object of the present invention is to provide a game calling device that overcomes the problems with the prior art described above, and particularly one that provides a calling device capable of producing high and low sounds plus a whistle sound for attracting Sandhill Cranes and certain other waterfowl.

A further object of the present invention is to provide a game calling device that fits comfortably in the user's hands during use, that allows a user's hands to be cupped over the discharge end to control the sound out of the device, and that allows a variety of different and interchangeable vibratory inserts to be used to produce different pitch sounds.

A further object of the present invention is to provide a game calling device having a mouthpiece with closely spaced inlet openings that allow sounds to be produced individually or several at a time to imitate the sound of a large flock of cranes or other animals.

A still further object of the present invention is to provide an improved method of calling game animals using a game calling device having the unique structure described herein.

To accomplish these and other objects, a game calling device capable of producing variable pitched sounds is provided. The variable pitched sounds include high and low pitch sounds produced by two reed inserts, and a whistling sound produced by a whistle insert. The body of the device has a truncated fan-shape with a mouthpiece end and a discharge end and multiple bores extending through the body from the mouthpiece end to the discharge end. The two reed inserts are located in two of the bores, and the whistle insert is located in a third one of the bores. A mouthpiece having three separate inlet openings is located at the mouthpiece end of the body and can be used by blowing air through all three bores simultaneously or one at a time. The three bores extend through the body in a diverging configuration relative to each other from the mouthpiece end toward the discharge end. The discharge end of the body has a convex curvature in plan view that provides a curved outer circumference of the fan-shape, and the mouthpiece has a concave curvature in plan view that provides a truncated apex portion of the fan-shape. The reed inserts and whistle insert are held within the respective bores of the body by O-rings.

According to a broad aspect of the present invention, a game calling device is provided, comprising: a body having a mouthpiece end and a discharge end and multiple bores extending through the body from the mouthpiece end to the discharge end; a first reed insert located in a first one of the bores; a second reed insert located in a second one of the bores; and a whistle insert located in a third one of the bores.

According to another broad aspect of the invention, a game calling device is provided, comprising: a body having a mouthpiece end and a discharge end, and multiple bores extending through the body from the mouthpiece end to the discharge end, the body having a truncated fan-shape in plan view with lateral sides of the fan-shape emanating radially outwardly and diverging relative to each other from the mouthpiece end toward the discharge end; and a plurality of vibratory inserts located in the bores for producing selected sounds as air is forced through the bores from the mouthpiece end to the discharge end.

According to another broad aspect of the invention, a method of calling game animals is provided, comprising the steps of: providing a game calling device as described above; and selectively blowing air into the three inlet openings of the mouthpiece of the device to produce sounds having different pitches, with one of the sounds being a whistling sound.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

Figure 1:
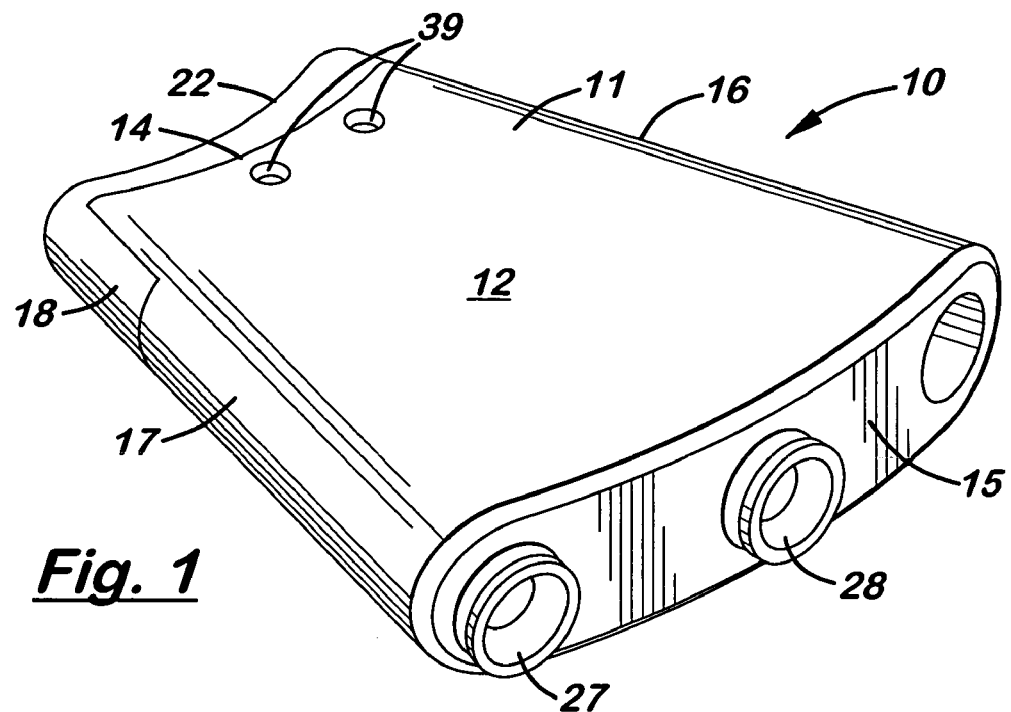
FIG. 1 is a perspective view of a game calling device according to the present invention.
Figure 2:
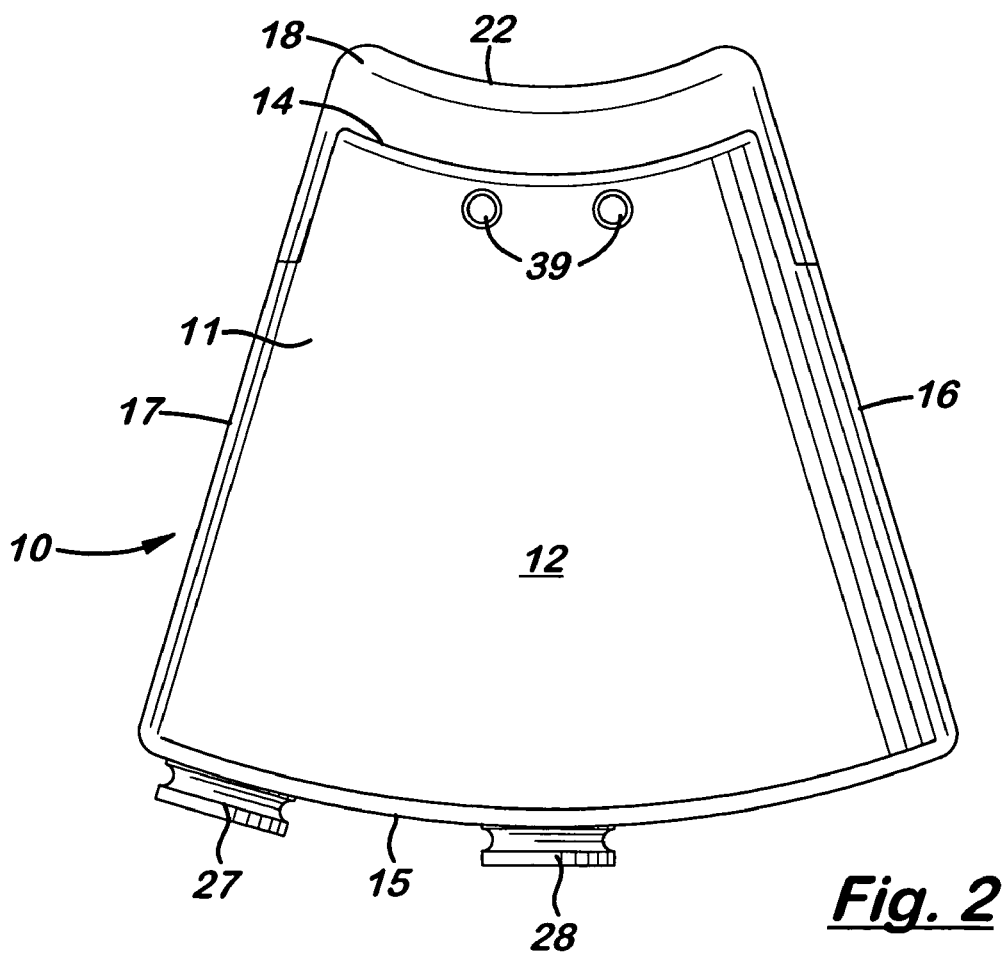
FIG. 2 is a plan view of the game calling device shown in FIG. 1.
Figure 3:
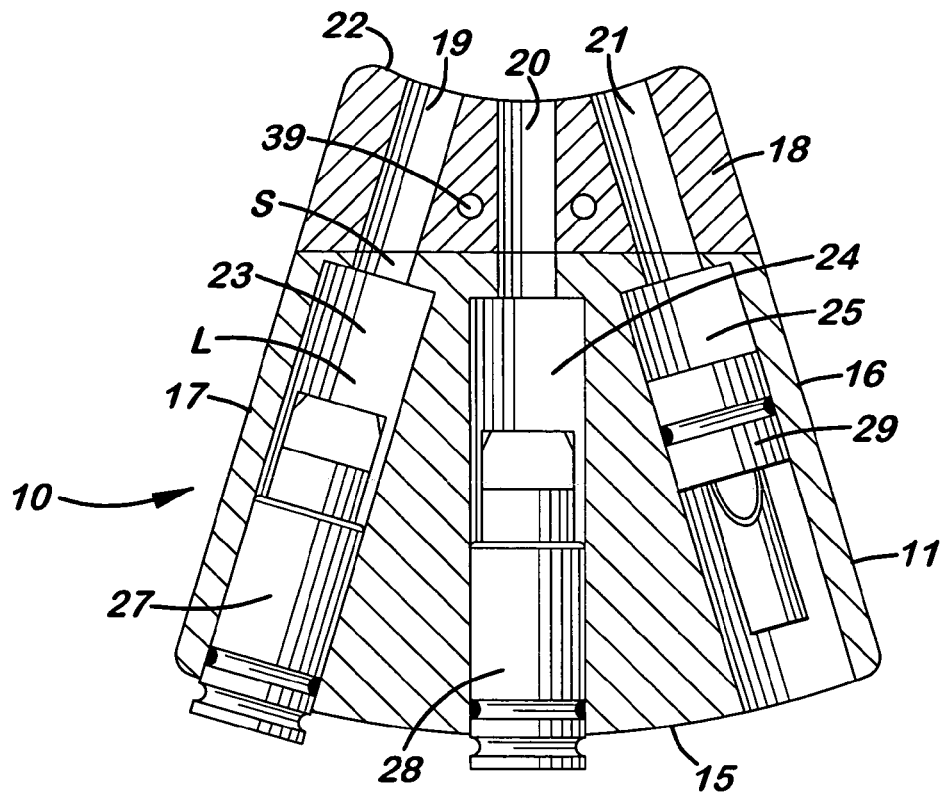
FIG. 3 is a cross sectional plan view of the game calling device.
Figure 4:
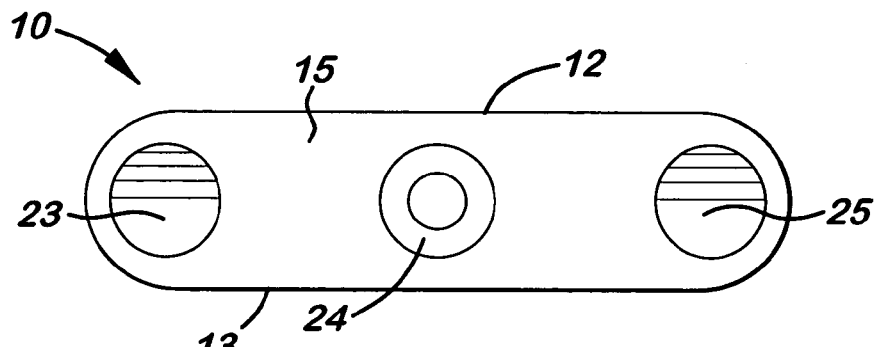
FIG. 4 is an end view showing the discharge end of the game calling device.
Figure 5:
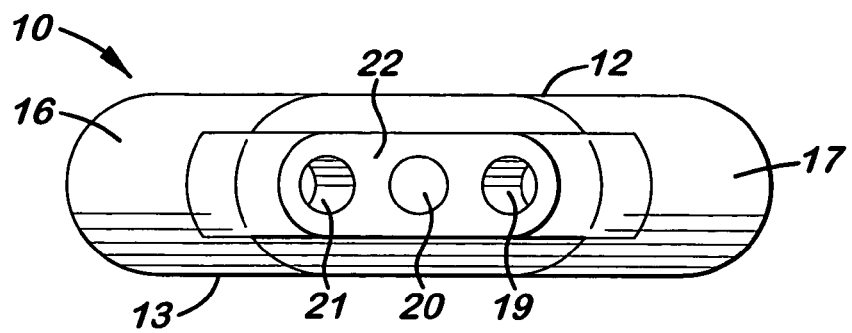
FIG. 5 is an end view showing the mouthpiece end of the game calling device.
Figure 6:
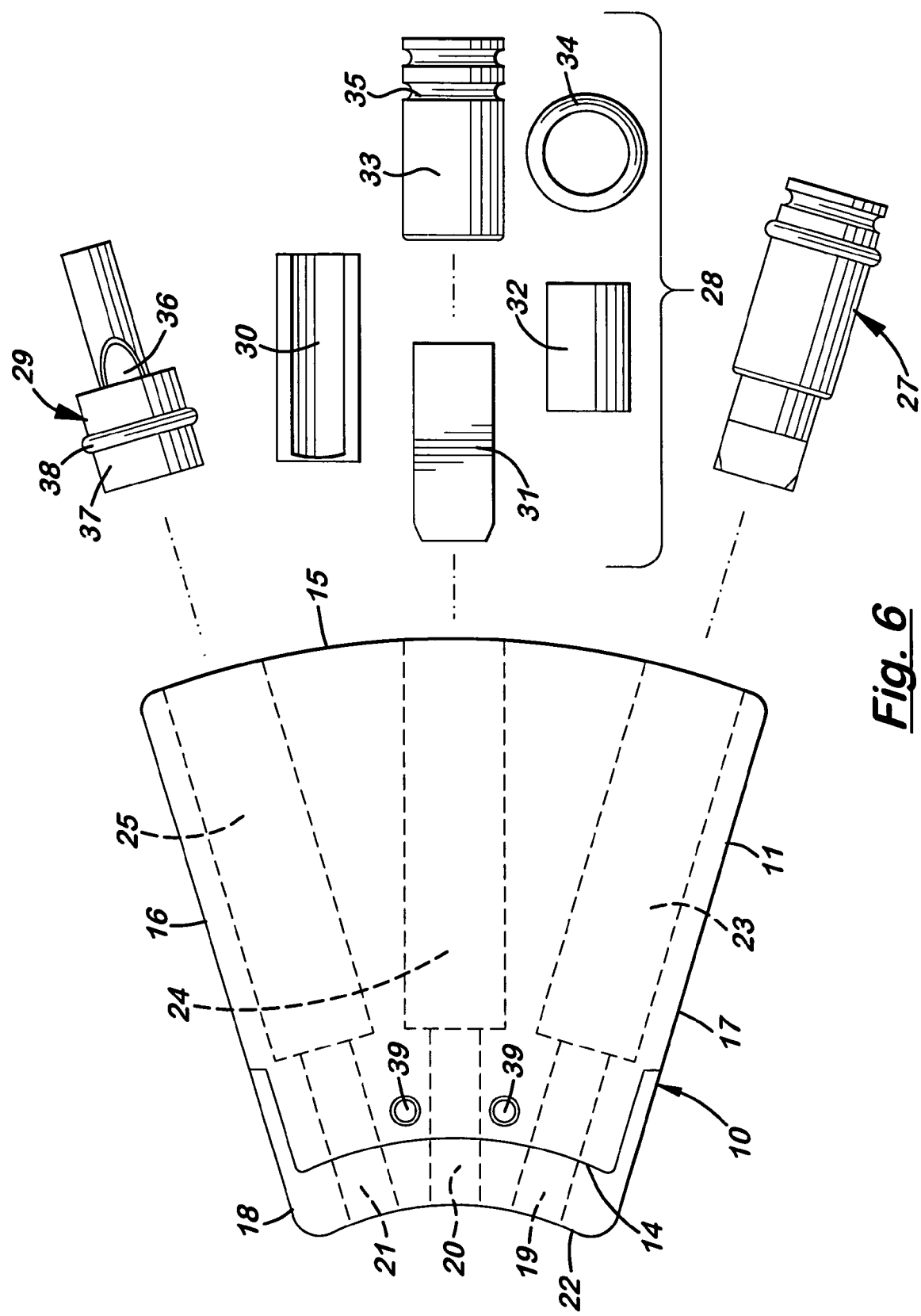
FIG. 6 is an exploded plan view showing the various components of the game calling device.

A game calling device 10 for mimicking a broad range of sounds according to the present invention will now be described with reference to FIGS. 1 to 6 of the accompanying drawings.

The game calling device 10 has a body 11 with a shape in plan view resembling a truncated fan. The body 11 has a top side 12, a bottom side 13, a mouthpiece end 14, a discharge end 15, and lateral sides 16, 17. The lateral sides 16, 17 emanate radially outwardly and diverge relative to each other from the mouthpiece end 14 to the discharge end 15, thereby forming the lateral sides of the fan-shape. The discharge end 15 has a convex curvature providing a curved outer circumference of the fan-shape. The mouthpiece end 14 of the body 11 provides a truncated apex portion of the fan-shape. The body 11 can be made, for example, of layered wood, which will provide an attractive appearance, or it can be machined out of acrylic or other similar plastic materials, which will provide a durable and long lasting construction.

A mouthpiece 18 is located at the mouthpiece end 14 of the body 11. The mouthpiece 18 can be a separate component secured to the body 11, or it can be formed as an integral part of the body 11. In the preferred embodiment, the mouthpiece 18 is made of a hard surfacing material, such as Corian® material by Dupont, and is dadoed and glued into the mouthpiece end 14 of the body 11. In an alternative embodiment, the mouthpiece 18 and body 11 are machined as one integral piece out of acrylic or other suitable plastic materials. The mouthpiece 18 has three separate inlet openings 19, 20, 21 for blowing air into the body 11 of the calling device 10. The inlet openings 19–21 are spaced apart such that a user can selectively blow air through each inlet opening individually, or all three inlet openings simultaneously. The mouthpiece 18 has a concave curvature in plan view on the side 22 closest to the user's mouth, which corresponds to the convex curvature of the discharge end 15 of the body 11.

A plurality of bores 23, 24, 25 extend through the body 11 from the mouthpiece end 14 to the discharge end 15. The bores 23–25 each have a large diameter portion L and a small diameter portion S. The small diameter portions S are aligned with the corresponding inlet openings 19–21 in the mouthpiece 18 for receiving air blown through the mouthpiece 18. The large diameter portions L of the bores 23–25 contain vibratory inserts 27, 28, 29 for producing the desired sounds of the calling device 10 as air is blown through the respective bores 23–25. The bores 23–25 are generally coplanar with each other and extend through the body 11 in a diverging configuration relative to each other from the mouthpiece end 14 toward the discharge end 15. In the preferred embodiment, the bores 23–25 are angularly spaced about 15 degrees apart from each other.

The vibratory inserts include first and second reed inserts 27 and 28 located in two of the bores 23, 24 of the body 11 for producing selected sounds as air is forced through the bores 23, 24 from the mouthpiece end 14 to the discharge end 15. Each of the reed inserts 27, 28 has a tone board 30, a reed 31 and a stopper 32 assembled together as a unit within a cylindrical outer part 33 to generate a desired sound. The reed inserts 27, 28 have O-rings 34 fit into corresponding outer grooves 35 for securing the inserts 27, 28 within the bores 23, 24 of the body 11. The first and second reed inserts 27, 28 are preferably tuned for producing different pitch sounds.

The pitch of the sounds produced by the vibratory reed inserts 27, 28 is a function of the length of the reed 31, as well as its width, stiffness, thickness and other factors that affect the modulation of the air flowing through the device 10. The pitch of the sound produced by the vibratory reed inserts 27, 28 can be changed easily in the present invention by removing the respective vibratory reed insert 27, 28 from its bore 23, 24 at the discharge end 15 of the body 11, and then changing a position of the stopper 32 relative to the tone board 30 and the reed 31. The reed insert 27, 28 can then be slid as a unit back into the bore 23, 24 of the body 11. In the preferred embodiment, one of the vibratory reed inserts 27, 28 is adjusted to produce a relatively low pitch sound, and the other vibratory reed insert 27, 28 is adjusted to produce a relatively high pitch sound.

The third vibratory insert 29 located in the bore 25 is a whistle insert having a much higher pitch than the two reed inserts 27, 28. The whistle insert 29 is preferably constructed of brass tubing and has an inner sound-producing part 36, a cylindrical outer part 37, and an O-ring 38 placed in a groove around the outer circumference of the cylindrical outer part 37. The inner sound-producing part 36 has a construction similar to conventional police or dog whistles and is preferably tuned to about 2500 Hz. As with the reed inserts 27, 28, the whistle insert 29 can be removed from the bore 25 easily and replaced or rearranged into a different bore 23, 24 by simply pulling it out of the discharge end 15 of the bore 25 and pushing it into a different bore 23, 24. The O-rings 34, 38 on the inserts 27–29 provide a friction fit within the bores 23–25 that holds the inserts 27–29 snugly during use while still allowing the inserts 27–29 to be removed and rearranged easily when it is desired to reconfigure the device 10.

A pair of holes 39 are provided in the body 11 for receiving a lanyard or call keeper (not shown).

The construction of a game calling device 10 according to the present invention has been described above. A method of using the game calling device 10 will now be described. Generally speaking, the game calling device 10 can be used to produce the desired sounds by holding the body 11 and blowing into the mouthpiece 18 much like a harmonica, with the user's hands cupped over the discharge end 15.

As explained above, the preferred embodiment of the game calling device 10 has three bores 23–25 extending through the body 11 with the first and second reed inserts 27, 28 in two of the bores 23, 24 and the whistle insert 29 in the third bore 25. The game calling device 10 is used by gripping and holding the rounded edges at the lateral sides 16, 17 of the body 11 with a first portion of the user's hands while placing a second portion of the user's hands over the discharge end 15 of the body 11. In this manner, the user's hands are cupped over the lateral sides 16, 17 and discharge end 15 of the body 11. The user then places the mouthpiece 18 to his or her mouth and blows air into one or more of the inlet openings 19–21 to force air past one or more of the vibratory inserts 27–29. Since the inlet openings 19–21 are spaced apart from each other, the user can selectively blow air into the three inlet openings 19–21 in a selected sequence to produce the desired sounds. For example, the user can blow air into one of the inlet openings 19–21 part of the time for sounding one of the vibratory inserts 27–29, and the user can blow air into two or more of the inlet openings 19–21 another part of the time for sounding two or more of the vibratory inserts 27–29 simultaneously.

The user can produce guttural sounds with the mouthpiece 18 by twirling the tongue as air is blown into the inlet openings 19–21, which is similar to the rolling of the RR's in the Spanish language. The cupping of the hands over the discharge end 15 of the body 11 greatly controls the sound out of the device 10. The whistle insert 29 is an important feature of the invention because it produces the sound made by junior Sandhill Cranes. With practice the whistle insert 29 can also be used to mimic the sounds of a Mallard Drake, Wood Duck, Pintail, Teal, and so forth. Other alternative ways of using the game calling device 10 of the present invention will be apparent to those skilled in the art.

An alternative embodiment of the present invention can be made by extending the length of the body to include a sound chamber below the inserts. Also, a fourth or fifth set of bores can be provided in the body to receive additional vibratory inserts for producing additional sounds.

While the invention has been specifically described in connection with specific embodiments thereof, it is to be understood that this is by way of illustration and not of limitation, and the scope of the appended claims should be construed as broadly as the prior art will permit.

What is claimed is:

1. A game calling device, comprising:
   a body having a mouthpiece end and a discharge end and multiple bores extending through the body from the mouthpiece end to the discharge end;
   a first reed insert located in a first one of said bores;
   a second reed insert located in a second one of said bores; and
   a whistle insert located in a third one of said bores.

2. The game calling device according to claim 1, wherein said second reed insert is tuned for producing a higher pitch sound than said first reed insert.

3. The game calling device according to claim 2, wherein a mouthpiece having three separate inlet openings is located at said mouthpiece end of the body for selectively blowing air into the first, second and third bores, respectively.

4. The game calling device according to claim 3, wherein said inlet openings in the mouthpiece are spaced apart such that a user can selectively blow through each inlet individually or all three inlets simultaneously.

5. The game calling device according to claim 1, wherein said whistle is tuned to approximately 2500 Hz.

6. The game calling device according to claim 1, wherein said bores extend through the body in a diverging configuration relative to each other from the mouthpiece end toward the discharge end.

7. The game calling device according to claim 6, wherein said bores are generally coplanar with each other.

8. The game calling device according to claim 7, wherein said bores are angularly spaced about 15 degrees apart from each other.

9. The game calling device according to claim 1, wherein said body has a truncated fan-shape in plan view with lateral sides of the fan-shape emanating radially outwardly and diverging relative to each other from the mouthpiece end toward the discharge end, and the discharge end having a convex curvature providing a curved outer circumference of the fan-shape.

10. The game calling device according to claim 9, wherein a mouthpiece is located at the mouthpiece end of said body, said mouthpiece has three separate inlet openings for selectively blowing air into the first, second and third bores, respectively, and said mouthpiece has a concave curvature in plan view that corresponds to said convex curvature of the discharge end.

11. The game calling device according to claim 1, wherein said first and second reed inserts each have a tone board, a reed and a stopper assembled together to generate a desired sound, and said inserts further comprise O-rings fit into corresponding outer grooves for securing the inserts within respective bores of the body.

12. A game calling device comprising:
   a body having a mouthpiece end and a discharge end, and multiple bores extending through the body from the mouthpiece end to the discharge end, said body having a truncated fan-shape in plan view with lateral sides of the fan-shape emanating radially outwardly and diverging relative to each other from the mouthpiece end toward the discharge end; and
   a plurality of vibratory inserts located in said bores for producing selected sounds as air is forced through the bores from the mouthpiece end to the discharge end;
   wherein said multiple bores comprise first, second and third bores.

13. The game calling device according to claim 12, wherein a mouthpiece having first, second and third inlet openings is located at said mouthpiece end of the body for selectively blowing air into the first, second and third bores, respectively.

14. The game calling device according to claim 13, wherein said inlet openings in the mouthpiece are spaced apart such that a user can selectively blow through each inlet individually or all three inlets simultaneously.

15. The game calling device according to claim 14, wherein said first, second and third bores are generally coplanar with each other and diverge relative to each other from the mouthpiece end toward the discharge end.

16. The game calling device according to claim 15, wherein the discharge end of said body has a convex curvature in plan view that provides a curved outer circumference of the truncated fan-shape, and said mouthpiece has a concave curvature in plan view that provides a truncated apex portion of said truncated fan-shape.

17. The game calling device according to claim 12, wherein said vibratory inserts comprise a first reed insert for producing a first sound, a second reed insert for producing a second sound having a higher pitch than said first sound, and a whistle insert for producing a whistling sound having a higher pitch than said second sound.

18. A method of calling game animals, comprising the steps of:
   providing a game calling device comprising:
      a body having a mouthpiece end, a discharge end, and first, second and third bores extending through the body from the mouthpiece end to the discharge end,
      first, second and third vibratory inserts placed in said first, second and third bores, respectively, for producing selected sounds as air is forced through the bores from the mouthpiece end to the discharge end, and
      a mouthpiece having three separate inlet openings located at the mouthpiece end of the body for blowing air into the first, second and third bores, respectively; and
   selectively blowing air into the three inlet openings to produce sounds having different pitches, with one of said sounds being a whistling sound.

19. The method of calling game animals according to claim 18, further comprising the steps of:
   providing the body of the game calling device with a truncated fan-shape in plan view with lateral sides of the fan-shape emanating radially outwardly and diverging relative to each other from the mouthpiece end toward the discharge end; and
   cupping a user's hands over the lateral sides and discharge end of the body to control the sounds out of the game calling device.

20. The method of calling game animals according to claim 18, wherein the inlet openings in the mouthpiece are spaced apart from each other, and wherein said step of selectively blowing air into the three inlet openings comprises blowing air through said inlet openings in a selected sequence in which air is blown through a plurality of said inlet openings part of the time and through only one of the inlet openings part of the time.

* * * * *